R. BERRY.
GASOLENE AND OIL DISPENSING APPARATUS.
APPLICATION FILED APR. 14, 1920.
1,366,862.
Patented Jan. 25, 1921.
2 SHEETS—SHEET 1.
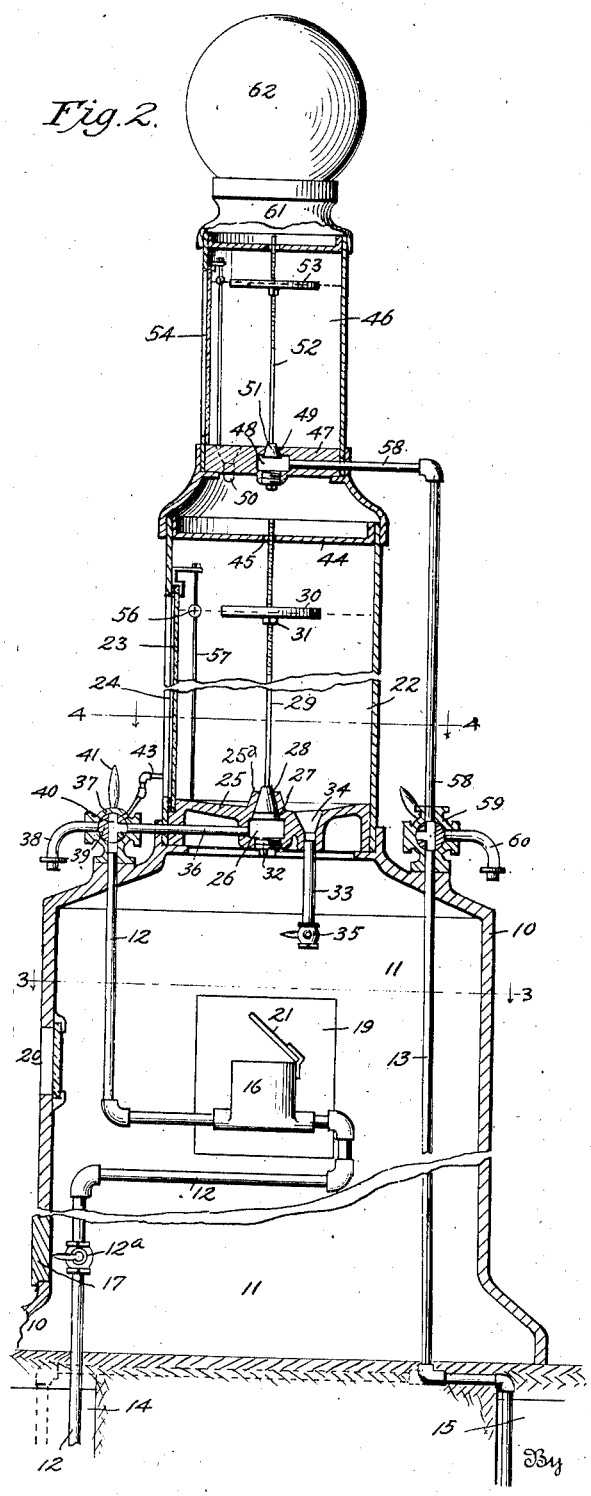
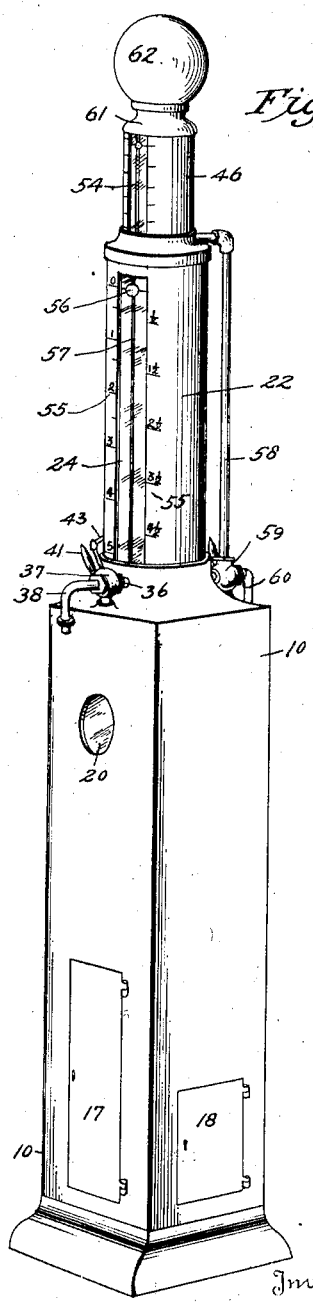
Inventor
Roy Berry.
E. W. Anderson & Son
Attorney R. BERRY.
GASOLENE AND OIL DISPENSING APPARATUS.
APPLICATION FILED APR. 14, 1920.
1,366,862.
Patented Jan. 25, 1921.
2 SHEETS—SHEET 2.
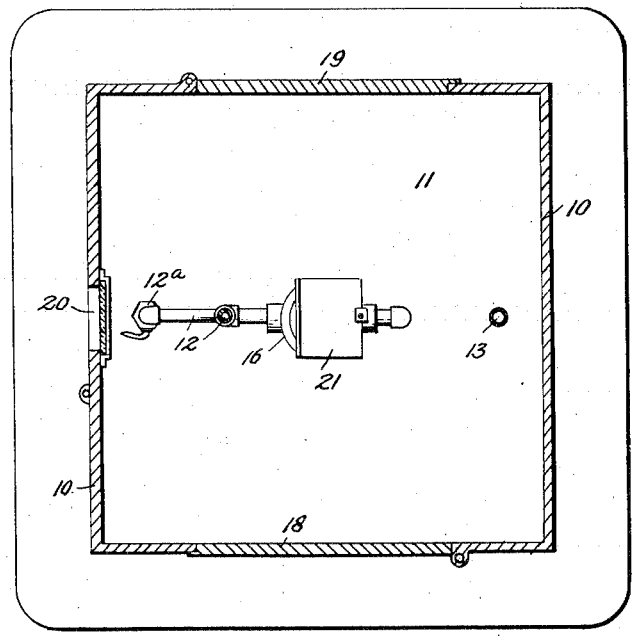
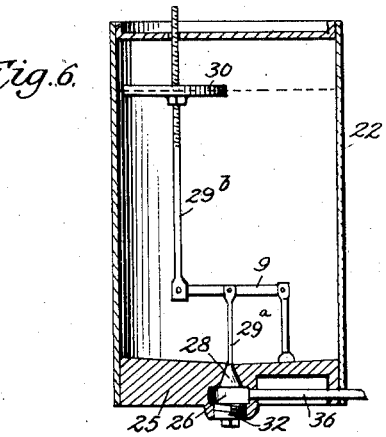
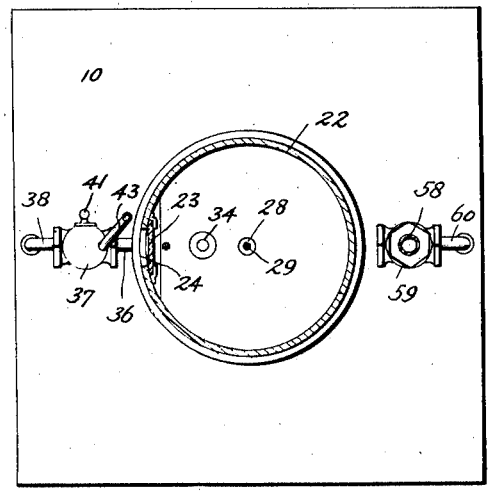
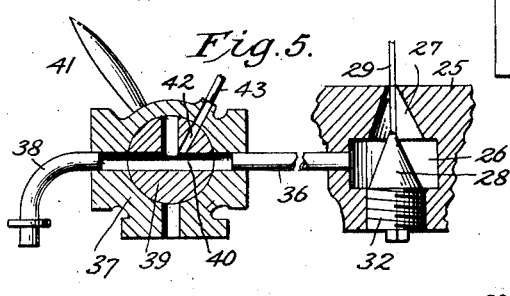
Inventor
Roy Berry,
E. W. Anderson & Son.
By
Attorneys

UNITED STATES PATENT OFFICE.

ROY BERRY, OF OLNEY, ILLINOIS.

GASOLENE AND OIL DISPENSING APPARATUS.

1,366,862.　　　　Specification of Letters Patent.　　Patented Jan. 25, 1921.

Application filed April 14, 1920.　Serial No. 373,855.

*To all whom it may concern:*

Be it known that I, ROY BERRY, a citizen of the United States, resident of Olney, in the county of Richland and State of Illinois, have made a certain new and useful Invention in Gasolene and Oil Dispensing Apparatus; and I declare the following to be a full, clear, and exact description of the same, such as will enable others skilled in the art to which it appertains to make and use the invention, reference being had to the accompanying drawings, and to letters or figures of reference marked thereon, which form a part of this specification.

This invention relates to a liquid dispensing apparatus of the class used by garage owners and proprietors of stations where gasolene is sold, and is designed to accurately measure the amount of gasolene, kerosene, or other liquid sold to automobile users and other customers.

The principal object of the invention is to provide a simple, inexpensive and novel apparatus for the purpose stated, having few parts in all, which parts are combined to accurately measure the quantity of gasolene or other liquid dispensed from a storage tank preferably placed underground, and when desired, measure with equal accuracy the liquid as it is stored. The measuring means and the liquid dispensed are at all times visible to the purchaser, who is thus enabled to determine if the full quantity paid for has been delivered, and if the liquid, such as gasolene, be free from water, sediment and other impurities.

A further object of the invention is to provide a dispensing apparatus having two liquid containers vertically alined, of equal or different capacities, with separate but similar dispensing mechanisms, for the purpose of measuring accurately two liquids of different kinds or qualities.

With the above as the primary objects in view, the invention consists of the novel combination and arrangement of parts hereinafter described in detail and illustrated in the accompanying drawings forming a part of this specification in which:

Figure 1 is a perspective view of the dispensing apparatus complete,

Fig. 2 is a central vertical sectional view,

Fig. 3 is a horizontal sectional view on the line 3—3 of Fig. 2,

Fig. 4 is a like view on the line 4—4,

Fig. 5 is a detail sectional view of the control valve in position for filling the measuring container, Fig. 6 is a detail sectional view of a modified form of the container inlet and outlet valve.

In the drawings, 10 indicates the base of the dispenser which may be rectangular in cross section, as shown, circular or of other shape as desired. The walls of the base 10 inclose a chamber 11, through which pass the valved supply pipes 12 and 13 from storage tanks 14 and 15, or from one tank 14, and in which chamber is placed a meter 16 of any suitable type, to measure or indicate the quantity of liquid that passes from the storage tank to be dispensed. Doors 17, 18 and 19 in the sides of base 10 provide access to the chamber 11. An opening 20, which may be glazed, is also made in one side of the base near the top to permit a purchaser seeing the dial of meter 16. If the dial be on top of the meter, a reflector 21 will be so placed as to render the dial visible from opening 20.

On the top of base 10 is mounted an upright liquid container 22 with a long vertical slot in one side closed by a strip of glass 23 to form a window 24 through which the height of liquid in the container can be seen by a purchaser. The bottom 25 of the container has a central passage 26 formed therethrough, the upper end of which passage is tapered to form a seat 27 for an inwardly closing conical valve 28. Fastened to the top of the valve is a rod 29 which as shown in Fig. 2, extends to the top of the container and is threaded at its upper end. A float 30 is screwed on the rod 29 to permit of vertical adjustment of the float, which after adjustment is locked by nut 31. A modification of the connection between the valve and float is shown in Fig. 6 and as there illustrated the valve rod 29ª is short and pivoted to a horizontal lever 9 between its ends. One end of the lever 9 is pivotally supported on a standard extending upwardly from the bottom 25 of the container 22. A rod 29ᵇ is pivoted on the other end of the lever 9 and extends to the top of the container, and on this rod is mounted the adjustable float 30. The lower end of passage 26 is closed by a screw plug 32 to prevent escape of liquid and permit of access to the valve. A second opening is made through the container bottom 25 for a drain pipe 33, having a conical upper end to form a sediment chamber 34, toward which the bottom of the container inclines. A valve 35 is fitted on the bottom of the drain pipe 33 to vent the same when necessary.

A pipe 36 extends horizontally from the passage 26 in the container bottom to the outside of the container and is there fitted with a control valve 37, to which is also attached the upper end of supply pipe 12. A hose coupling 38 is also screwed into the control valve in line with pipe 36. The plug 39 of valve 37 has a T-shaped port 40 therein and a turning handle 41 on one end. Another port 42 in the turning plug communicates with the T-shaped port and, when the valve is in discharge position, with a starting pipe 43 between the container and the control valve. The top 44 of the container 22 is perforated as at 45 to permit air flowing freely into and out of the container as it empties and fills. The valve rod 29 may also pass through this perforation as the float 30 rises.

Above the container 22 and supported thereon is a second and preferably smaller container 46, having a bottom 47 with passage 48, valve seat 49, and drain pipe 50 similar to and serving the same purpose as like parts in the bottom 25 of the main container. There is also a valve 51 closing upwardly against the valve seat 49, having a threaded rod 52 and an adjustable float 53 as in the large container. A glazed window 54 in the side of container 46 shows the height of liquid therein.

On the wall of each container at each side of the window, or on the glass itself, is marked a scale 55 of gallons and fractions thereof which, as the containers empty, show the quantity of fluid delivered. A small float 56 slidable on a rod 57 within container 22 just back of window 24 rises and falls with the liquid in the container and indicates clearly the liquid level, and in connection with the scale, the quantity of liquid drawn off. A similar float may also be placed in the smaller container 46.

From the passage 48 in the bottom of the small container 46, a pipe 58 extends down to the top of base 10 and is screwed at its lower end into one side of a control valve 59, similar to valve 37, the control valve being connected on its other side with supply pipe 13. Between these two connections the valve is fitted with a hose coupling 60.

A support 61 of some ornamental character is mounted on the top of the small container 46 to carry a translucent glass globe 62 containing a light, as in present use.

In operation, the apparatus when employed for dispensing gasolene is usually erected on the ground convenient to the approach of automobiles. Should the container 22 be empty, the weight of valve 28, its rod 29 and float 30 will cause the valve to fall to the bottom of passage 26 and open communication between said passage and the container. To fill the container 22, the plug 39 of control valve 37 is moved into position shown in Fig. 2 so that gasolene under air or gravity pressure in storage tank 14 will be forced up through supply pipe 12 and meter 16 to control valve 37 through the port 40 in the plug of control valve, by pipe 36 to passage 26 and into the container 22 past the conical valve 28. Owing to the position when in lowered or open position below pipe 26, there is no tendency to raise said valve to close the inlet to the container by the passage of the liquid past the valve. Gasolene will continue to flow into the container until it rises high enough to lift the float and close the valve 28, thus cutting off the supply to container. The quantity of gasolene in the container when the valve 28 closes will always be the same and is indicated on the scale 55 by the small float 56. Accuracy is assured by making the float 30 adjustable on the valve rod. The container 22 is now filled with a predetermined quantity of gasolene, say five gallons, and a purchaser desiring say three and one half gallons will have his receptacle connected by a hose to coupling 38, and the salesman, turning the control valve 37 to the position shown in Fig. 5, cuts off the supply pipe 12 and connects the pipe 36, through port 40 to the hose coupling 38. The weight of gasolene in the container will open valve 28 and allow the gasolene to flow from the container into the purchaser's receptacle. The outflow of gasolene from the container will of course lower the gasolene level and the small float 56 descending therewith will clearly indicate on the scale the quantity of gasolene withdrawn. As soon as the float reaches the three and one-half gallon mark on the scale, the dealer turns the control valve to cut off the outflow, which again connects the supply pipe 12 to the container and the latter is refilled. The purchaser can watch the scale 55 as the liquid is being delivered, and also the meter and scale during the refilling operation and so assure himself that the correct quantity bought has been delivered. By the same operation, the container 46 is filled and emptied when control valve 59 is manipulated.

If the valve 28 from any cause fails to open when the control 37 is turned to dispensing position, there will be a flow through the starting pipe 43 which will lower the level of the liquid and permit the weight of float 30 opening the valve 28.

The purchaser is also assured of getting gasolene free of water and sediment, as such impurities immediately fall to the bottom of the container and drain into the pipe 33. The line between gasolene and water, if there be much of the latter, will also be visible through the window 24. When water and other foreign matter so collects in the container, it is prevented from passing out with the gasolene because the valve seat 27 is formed in an elevated portion 25ª, of the bottom, and the entrance to the valve seat is in the top of this elevation.

It is apparent that a dispensing apparatus constructed as described will be a simple, cheap and reliable apparatus, having few movable parts of the most reliable kind and but one valve to control the inflow and outflow of liquid. The stored liquid to be purchased is always visible to the purchaser and he can see that the correct quantity paid for is delivered. No pumps are used, and therefore no air will be mixed with the gasolene, as often happens when pumps are employed, due to defective valves and other causes. The liquid in the container can be returned each night, or at any time, to the storage vessel by relieving the latter of air pressure and turning the control valve to the filling position shown in Fig. 2, thus permitting the liquid in the container to flow back. Then, by opening door 17 in the base, turning a valve 12ª on the supply pipe and locking the door, no liquid can be dispensed until the valve is opened and air pressure again applied to the storage tank. By placing valve 28 at the bottom of the container, to close the gasolene inlet opening when the container is filled, the pressure of gasolene behind the valve will assist in keeping said valve closed; furthermore the float is within the container and below the top of the window so that it is impossible to raise the level or top of the gasolene out of the purchaser's sight, who can thus tell at a glance if the full amount is in the container. A filter may be placed in the supply pipe 12 below the meter 16, but as such devices are well known and in common use, it has been omitted.

It is self evident that by enlarging the base 10 of the dispenser, two or more containers 22 may be mounted thereon, each provided with its own filling and discharging pipes and valves, thus enabling a merchant to handle different grades of gasolene from the same stand, but from different containers, thereby saving the expense of installing separate dispensers.

Having thus described the invention what is claimed as new is:—

1. The combination in a liquid dispensing apparatus of a storage tank for liquid under pressure, a measuring container, a supply pipe between said storage tank and the bottom of the container, an upwardly closing valve at the outlet end of the supply, said valve when in open position being located below said supply pipe, a float in said container connected to said valve for closing the same when the container is filled, and a manually operated three-way control valve in the supply pipe for directing the flow of liquid first to the container and from the latter to a delivery outlet.

2. The combination in a liquid dispensing apparatus of a storage tank for liquid under pressure, a measuring container having a window in one side and a scale adjacent said window, a supply pipe between said storage tank and the bottom of said container, an upwardly closing valve at the outlet end of said supply pipe, said valve when in open position being located below said supply pipe, a rod fixed to said valve extending into the container, a float in said container vertically adjustable on said rod and adapted to close said valve when the container is filled, and a manually operated three-way control valve in the supply pipe for directing the flow of liquid from the supply tank, first to the container and from the latter to a delivery outlet.

3. The combination in a liquid dispensing apparatus of a storage tank for liquid under pressure, a measuring container having a window in one side extending from the top to the bottom thereof, a scale adjacent said window, an air opening in the top of the container and a passage in the bottom thereof, a supply pipe between the storage tank and said passage, an upwardly closing valve in said passage for stopping the admission of liquid into the container, said valve when in open position being located below said supply pipe, a rod fixed to said valve extending into the container, a float in said container vertically adjustable on said rod and adapted to close said valve when the container is filled, and a manually operated three-way control valve in the supply pipe for directing the flow of liquid, first to the container and from the latter to a delivery opening.

4. The combination in a liquid dispensing apparatus of a storage tank for liquid under pressure, a measuring container having a glazed window in one side extending from the top to the bottom thereof, a scale adjacent said window, an air inlet opening in the top of the container, and a bottom formed with a passage therethrough for liquid and an opening for a sediment pipe, a supply pipe between the storage tank and said passage, a meter inserted in the supply pipe line, an upwardly closing valve in said passage for stopping the flow of liquid into the container, said valve when in open position being located below said supply pipe, a threaded rod fixed to said valve extending into the container, a float in said container vertically adjustable on said rod and adapted to close said valve when the container is filled, a control valve in the supply pipe, a manually operated plug for said control valve having a T-shaped port therein adapted when in one position to connect the storage tank with the container and when in another position to connect the container to a delivery opening, and a starting pipe between the container and the control valve.

5. The combination in a liquid dispensing apparatus of a storage tank for liquid, such as gasolene, under pressure, a measuring container having a drainage outlet in the bottom and a window in one side through which the contents of the container will be visible, the bottom of said container being inclined toward said drainage outlet, a supply pipe between said storage tank and the bottom of the container, an upwardly closing valve at the outlet end of said supply pipe, a seat for said valve in an elevated portion of the bottom of the container and opening through the top of said elevated portion, a rod on said valve, a float in the container vertically adjustable on said rod, and a manually operable three-way control valve in the supply pipe.

In testimony whereof I affix my signature in presence of two witnesses.

ROY BERRY.

Witnesses:
ESTHER BOSART,
EDW. SUESS.